Figure 1:
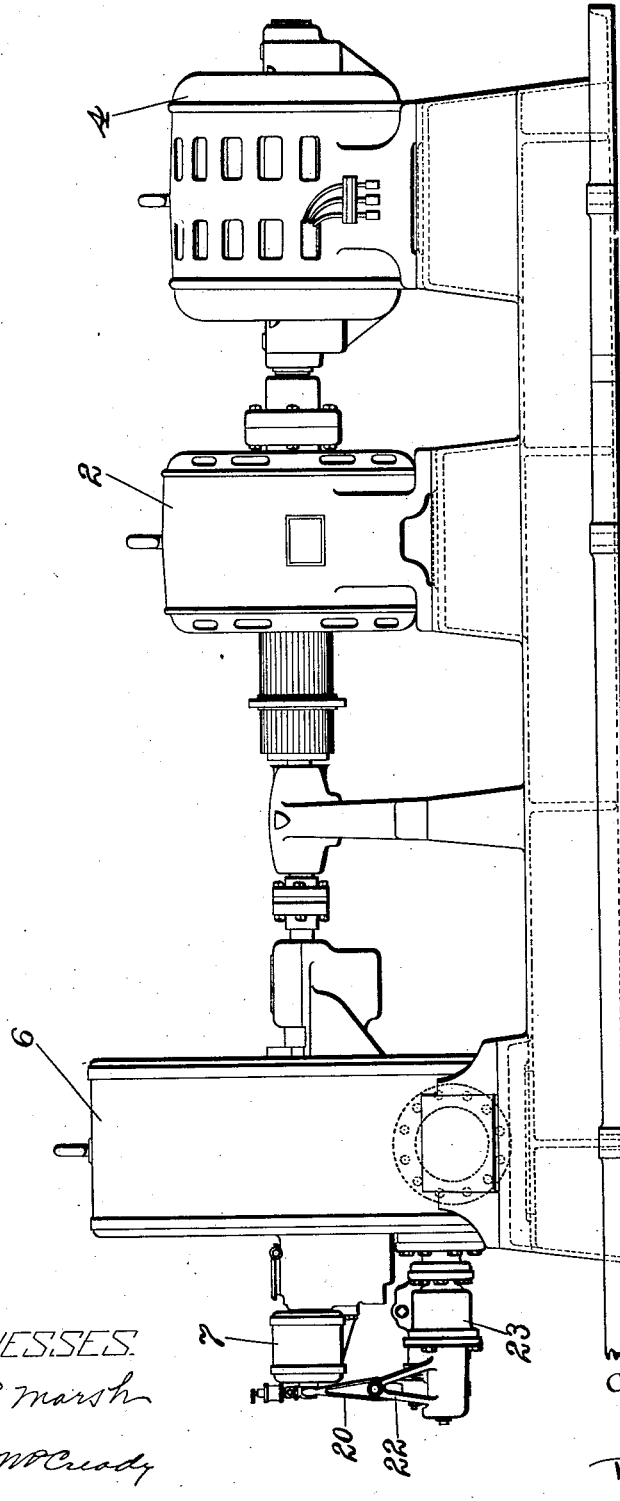

UNITED STATES PATENT OFFICE.

CHARLES W. E. CLARKE, OF BROOKLINE, MASSACHUSETTS.

DUPLEX DRIVING MECHANISM.

1,185,288. Specification of Letters Patent. Patented May 30, 1916.

Application filed January 4, 1915. Serial No. 380.

*To all whom it may concern:*

Be it known that I, CHARLES W. E. CLARKE, a citizen of the United States, residing at Brookline, in the county of Norfolk and State of Massachusetts, have invented certain new and useful Improvements in Duplex Driving Mechanisms, of which the following description, in connection with the accompanying drawings, is a specification, like reference characters on the drawings indicating like parts in the several figures.

It is a common custom to install two independent drives for a machine, sometimes in order to provide for the possible failure of one of the driving units or its source of power or for the purpose of utilizing one source of power which is more economical than another but which is not altogether dependable. The present invention is concerned with installations of this general character in which two motors are employed to drive a given machine or set of machines and will be herein disclosed as embodied in an exciter set for use with alternating current generators.

Usually the direct current generator that supplies the exciting current for one or more alternators is driven by an alternating current motor which depends for its current on the alternator or alternators excited by the direct current generator. Some other motive power for the exciter also is provided since the motor cannot drive the generator until the exciting current has been turned on to the alternator. If, while the machines are in operation, the speed of the alternator is reduced due to some abnormal conditions, the resulting reduction in speed of the motor causes a decrease in the exciting current which, in turn, produces a further decrease in the voltage of the alternator and a still further reduction in the speed of the exciter motor. This condition rapidly goes from bad to worse until the motor stops and the alternator voltage falls flat. It is then necessary for the attendant to start up the exciter by means of its other driving unit, and to bring it up to speed before the alternator can be excited again and the alternating current motor be again set in operation. In the meantime, the service supplied by the generators which are dependent on the exciter is at a standstill. The same interruption of service is, of course, likely to occur where the drive for any machine must be shifted manually from one motor to another.

The present invention aims to provide a driving apparatus of the general character above indicated in which the liability of interruption of operation of the driven machine shall be substantially reduced.

It is also an object of the invention to eliminate the necessity for manually rendering the reserve motor effective to drive the machine when its companion fails to drive the machine at the required speed.

Figure 2:
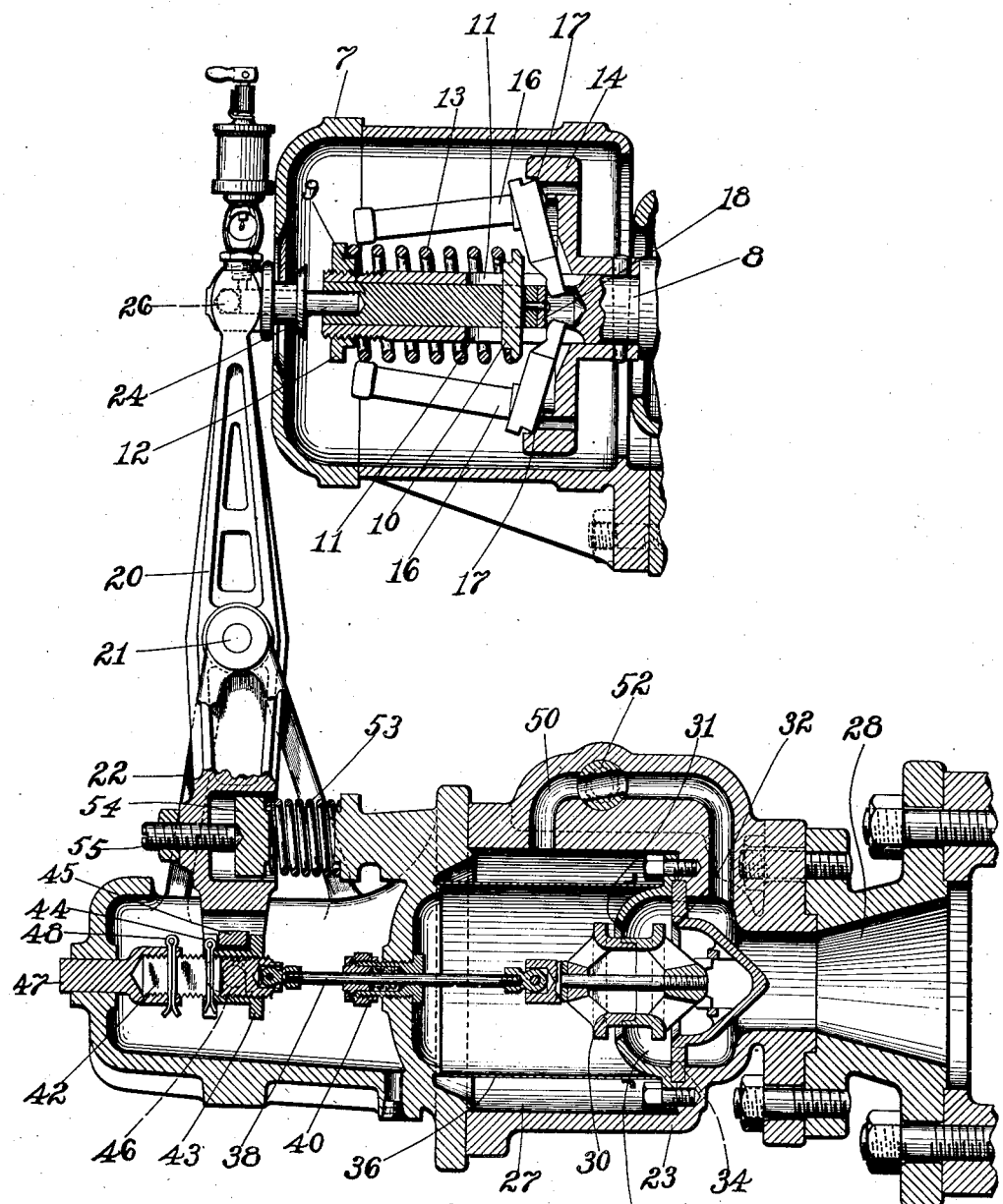

Referring now to the drawings, Figure 1 is a side elevation of an exciter set embodying the invention; and Fig. 2 is a vertical, sectional view through an automatic controlling mechanism for the set.

In the drawings, 2 indicates a direct current generator designed in the present instance to supply the exciting current for one or more alternating current generators; 4 is an alternating current motor designed to be driven by the current produced by one or more of the alternators excited by the generator 2; and 6 is a steam turbine. The generator 2, motor 4 and turbine 6 are connected to rotate together so that when either the motor or the turbine is operating it drives both the generator and the rotor of the other driving unit. In the arrangement shown the shafts of the machines 2, 4 and 6 are directly connected together but it is obvious that they might be geared or otherwise connected to rotate together.

The controlling mechanism comprises a centrifugal apparatus which is inclosed in a casing 7 and is mounted fast on a shaft 8 forming an extension of the shaft of the turbine. The outer end of the shaft 8 is counterbored to receive a plunger 9 which carries near its inner end a bar 10 that projects transversely through the plunger and through slots 11 formed in the shaft 8 at opposite sides of the plunger. A collar 12, threaded on the outer end of the shaft 8, backs up a helical spring 13 which bears on the bar 10 and tends to force it away from the collar 12. Back of the slots 11, the shaft 8 has pinned thereto a large collar 14 in which are mounted two weighted arms 16 located on opposite sides of the shaft. These arms are L-shaped, the upright parts of the L's extending parallel to the shaft, and they are each provided with knife edge portions 17 that bear against suitably shaped seats formed in the member 14 and enable the weights or arms to have a pivotal movement about their respective edges 17, thus causing the outer ends of the arms to swing toward or from each other. The collar 14 has slots in which the arms 16 are guided for this swinging movement. The inner ends of the arms extend toward each other through the slots 11 in the shaft 8 and both bear against a hardened member 18 fast on the inner end of the plunger 9. Since the collar 14 is fast on the shaft 8, it rotates with this shaft, thus rotating both arms 16 about the axis of the shaft. The centrifugal inertia of the arms 16 tends to throw their outer ends away from each other, thus tipping the arms about their knife edges 17 and causing them to move the plunger 9 outwardly against the tension of the spring 13.

A vertical lever 20 is fulcrumed at 21 on a bracket 22 supported by a part of the valve casing 23 and the movement of the plunger 9 produced in the manner just described is transmitted to this lever by means of a pin 24 projecting axially from the end of the plunger 9 and bearing against a ball 26 seated in a bearing formed for it in the upper end of the lever 20. The lever 20 operates a valve that controls the supply of steam to the turbine 6. This valve is located in the casing 23 which is provided with a chamber 27 into which the steam is admitted from the boiler and a discharge passage 28 that conducts the steam from the valve to the turbine. The valve is of the balanced type and comprises a hollow plunger 30 of the construction usually employed in valves of this character, this plunger being provided with two seats movable into and out of engagement with coöperating stationary seats 31 and 32, respectively, formed in the partitions or walls that separate the steam chamber 27 from the outlet 28. These two walls or partitions are separated from each other by a space 33 into which the steam flows from the chamber 27 when the valve is opened and the partition in which the seat 32 is formed is provided with several apertures, one of which is indicated at 34, through which the steam flows from the space 33 to the discharge passage 28. The wall in which the seat 31 is formed is imperforate except for the opening for the valve. A steam strainer 36 of usual construction is mounted in the steam chamber 27 and the steam entering this chamber must pass through the strainer before reaching the valve 30.

The connections between the valve 30 and the lever 20 comprise a valve stem 38 pivotally connected to the valve and mounted to slide through a stuffing box 40 in the wall of the steam chamber. This stem is pivotally connected to a member 42 which has a threaded exterior surface and carries a collar 43 that is threaded on to the surface of the part 42 and is held in an adjusted position thereon by means of a cotter pin 44. The collar 43 is circumferentially grooved and a member 45 is seated in this groove astride of the collar and carries at opposite sides of the collar two pins
46. The lower end of the lever 20 is forked to straddle the collar 43 and the two members of this fork are each grooved or recessed to provide a bearing in which the two pins 46, respectively, are received. By this arrangement the swinging movement of the lever on its fulcrum is transmitted through the pins 46, member 45 and collar 43 to the part 42 and the valve stem 38, moving this stem in a direction to open or close the valve 30. By removing the cotter pin 44 the collar 43 can, of course, be adjusted along the member 42. The end of the part 42, opposite its connection with the valve stem 38, is threaded into a short plunger 47 which is mounted to slide through an aperture formed in the wall of the casing in alinement with the valve stem 38. A cotter pin 48, extending through the parts 47 and 42, hold them in adjusted relationship.

A compression spring 53 is interposed between a part of the valve casing and a disk 54 which is backed up by a bolt 55 that is threaded through a part of the lever 20 below its fulcrum. It will be evident from an inspection of Fig. 2 that this spring acts on the lever 20 in a direction tending to open the valve 30 and to hold the ball 26 at the upper end of the lever in contact with the pin 24.

In operating this apparatus the exciter 2 may be started up by turning the steam on to the turbine 6. When the exciter has come up to speed and the generators to which it supplies exciting current have been set in operation, the power then may be turned on to the motor 4, thus rendering it operative to drive the exciter. Ordinarily it is preferable to drive the exciter by means of the motor because of its high efficiency. If the exciter has merely its normal load, the motor and turbine, acting together, will tend to drive it at a speed considerably above normal. The controlling mechanism here becomes effective, however, to close the valve 30 and cut the turbine out of action. This operation is produced by the centrifugal action of the weights 16 operating through their connections with the valve 30 in the manner above described, and as will be readily understood by those familiar with the operation of centrifugal governors. The motor 4 then assumes the entire load, driving not only the exciter but also the rotor of the turbine 6. So long as the motor continues to drive the exciter at the required speed, the centrifugal mechanism will maintain the turbine in an idle condition. As soon, however, as the motor permits the speed of the exciter to fall below a point predetermined by the adjustment of the springs 13 and 53, the controlling mechanism will open the valve 30 and admit steam to the turbine, thus rendering the turbine effective to take part or even all of the load in case the motor drops out of operation completely. When the motor again becomes effective to assume its normal load, the speed of the exciter will again be raised to a point where the centrifugal mechanism will close the valve 30 and cut the turbine 6 out of operation again. Since the machines 2, 4 and 6 are driven in unison, the turbine operates very quickly to take up the load or any part of it dropped by the motor 4. The percentage of variation in speed due to the shifting of the load from one motor to the other is so low as to be immaterial for most classes of service. In other words, while the controlling mechanism automatically maintains normally a predetermined distribution of load between the motors, this mechanism is effective to shift the load from one motor to the other automatically as conditions require to maintain the speed of the generator substantially constant. The shifting of the load from one motor to the other in the manner just described takes place entirely without manual aid.
In order to keep the turbine at substantially its operating temperature while it is running idle, a small bypass 50 is provided between the steam chamber 27 and the outlet 28 through which a small quantity of steam is constantly admitted to the turbine, this quantity preferably being insufficient to operate the turbine but sufficient to keep it at its normal temperature. A hand valve 52 controls the flow of steam through the bypass 50. It is obvious that a driving apparatus of this character is applicable to machines other than exciters where, for any reason, it is important that the operation of the machine shall not be interrupted.
It will also be understood that the apparatus is susceptible to many changes and modifications without departing from the spirit or scope of the invention.
Obviously under some conditions it may be desirable to keep a small portion of the load on the turbine, using the exhaust steam from the turbine for heating purposes, and this result can of course be accomplished by adjusting the tension of the governor spring 13. Under this condition the controlling mechanism would still be effective as before to maintain a predetermined distribution of the load between the motor and the turbine and it would also act as above described to vary the amount of load taken by the turbine to cause the turbine and motor to drive the generator at substantially a constant speed.

Having thus described my invention, what I claim as new and desire to secure by Letters Patent of the United States is:

1. In an apparatus of the character described, the combination of a machine, two motors connected with said machine and each operative to drive both the machine and the rotor of the other motor, one of said motors acting normally to drive said machine while the other motor runs idly, and means responsive to changes in the speed of said machine to render the idle motor effective to drive said machine when the speed of the machine falls below a predetermined point and to cause the latter motor to run idly again when the speed of the machine is raised to a predetermined point.

2. In an apparatus of the character described, the combination of a machine, two motors connected with said machine and each operative to drive both the machine and the rotor of the other motor, and controlling mechanism for said apparatus operative automatically in response to changes in the speed of said machine to render one of said motors ineffective to drive the machine so long as the other motor drives the machine at a speed above a predetermined point, but operative to cause the latter motor to drive the machine as soon as the machine's speed drops below said point.

3. In an apparatus of the character described, the combination with an electric generator, of an electric motor normally effective to drive said generator, a steam turbine arranged to drive said generator, said turbine, motor and generator all being connected to rotate together when either the motor or the turbine is in operation, and controlling mechanism operative to render the turbine ineffective to drive the generator so long as the generator's speed remains above a predetermined point but operative to cause said turbine to drive the generator when the generator's speed falls below a predetermined point.

4. In an apparatus of the character described, the combination of a machine, an electric motor and a steam turbine both connected with said machine and each operative to drive both the machine and the rotor of the other driving member, and controlling mechanism for said apparatus operative automatically in response to changes in the speed of said machine to maintain normally a predetermined distribution of load between said motor and turbine but effective to shift the load from one driving member to the other automatically to maintain the speed of the machine substantially constant.

5. In an apparatus of the character described, the combination of a machine, an electric motor and a steam turbine both connected with said machine and each operative to drive both the machine and the rotor of the other driving member, controlling mechanism for said apparatus operative automatically in response to changes in the speed of said machine to maintain normally a predetermined distribution of load between said motor and turbine and constructed and arranged to vary the amount of load taken by the turbine to cause said turbine and motor to drive the machine at substantially a constant speed, and means for maintaining said turbine at substantially its operating temperature during periods when it is running idly.

6. In an apparatus of the character described, the combination with a machine, of an electric motor normally effective to drive said machine, a steam turbine normally running idle but arranged to drive said machine, said motor, turbine and machine being connected to rotate together, a centrifugal mechanism connected with said machine to rotate therewith, and means operated by said mechanism to control the supply of steam to said turbine, said means being operative to render the turbine effective to drive said machine when the speed of the machine drops below a predetermined point and to render the turbine ineffective again when the speed of the machine rises above a predetermined point.

In testimony whereof I have affixed my signature, in presence of two witnesses.

CHARLES W. E. CLARKE.

Witnesses:
JOHN H. MCCREADY,
ARTHUR J. SANTRY.